United States Patent
Saito et al.

(10) Patent No.: US 10,667,503 B2
(45) Date of Patent: Jun. 2, 2020

(54) FISHING REEL

(71) Applicant: Shimano Inc., Sakai, Osaka (JP)

(72) Inventors: Kei Saito, Osaka (JP); Satoshi Ikebukuro, Osaka (JP); Takuji Takamatsu, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/261,074

(22) Filed: Jan. 29, 2019

(65) Prior Publication Data

US 2019/0269115 A1    Sep. 5, 2019

(30) Foreign Application Priority Data

Mar. 1, 2018   (JP) .................................. 2018-036617

(51) Int. Cl.
*A01K 89/01*   (2006.01)
*A01K 89/033*   (2006.01)

(52) U.S. Cl.
CPC .... *A01K 89/01083* (2015.05); *A01K 89/0111* (2013.01); *A01K 89/05* (2015.05); *A01K 89/058* (2015.05)

(58) Field of Classification Search
CPC ...... A01K 89/011221; A01K 89/01928; A01K 89/011223
See application file for complete search history.

(56) References Cited

U.S. PATENT DOCUMENTS

| | | | |
|---|---|---|---|
| RE46,274 E * | 1/2017 | Shibata | ................. A01K 89/01 |
| 2009/0057461 A1* | 3/2009 | Hayashi | ................ F16D 41/067 |
| | | | 242/247 |
| 2010/0301149 A1* | 12/2010 | Bin Ahmad | ........... A01K 89/03 |
| | | | 242/244 |
| 2011/0174909 A1* | 7/2011 | Shibata | .......... A01K 89/011221 |
| | | | 242/230 |
| 2013/0206889 A1* | 8/2013 | Ochiai | ................. F16J 15/3204 |
| | | | 242/322 |
| 2016/0106083 A1* | 4/2016 | Niitsuma | ........... A01K 89/0192 |
| | | | 242/310 |
| 2017/0030469 A1* | 2/2017 | Hirayama | ...... A01K 89/011221 |
| 2017/0332614 A1* | 11/2017 | Saito | ................ A01K 89/01902 |

FOREIGN PATENT DOCUMENTS

JP        2015-159756 B2    9/2015

* cited by examiner

*Primary Examiner* — Emmanuel M Marcelo
(74) *Attorney, Agent, or Firm* — Global IP Counselors, LLP

(57) ABSTRACT

A fishing reel capable of casting a fishing line in a forward direction includes a reel body, a rotor, a one-way clutch and a case member. The rotor is rotatable relative to the reel body about an axis of rotation and has an internal space. The one-way clutch is configured to transmit power in only one direction. The case member is disposed in the internal space of the rotor and houses the one-way clutch, and has a flange portion projecting in a radially outward direction and a fixing portion disposed behind the flange portion in a position overlapping a part of the flange portion, as viewed from an axial direction, and being fixed to the reel body.

8 Claims, 5 Drawing Sheets

FISHING REEL

CROSS-REFERENCE TO RELATED APPLICATIONS

This application claims priority to Japanese Patent Application No. 2018-036617 filed on Mar. 1, 2018. The entire disclosure of Japanese Patent Application No. 2018-036617 is hereby incorporated herein by reference.

BACKGROUND

Field of the Invention

The present invention relates to a fishing reel.

Background Art

In a fishing reel, particularly a spinning reel that is capable of casting (unreeling) a fishing line in a forward direction, a rotor for winding the fishing line around a spool is rotatably disposed in a reel body. A one-way clutch housed in a case member for prohibiting rotation in the line-feeding direction is disposed inside the rotor. There is a gap between the case member and the rotor, and thus a risk of moisture entering the one-way clutch through the gap. Thus, in the spinning reel disclosed in Japanese Laid-Open Patent Application No. 2015-159756, for example, a plate-like member that projects in the radial direction is fixed to a front portion of a protective cover to prevent the intrusion of moisture into the one-way clutch.

SUMMARY

Recently, as one-way clutches have become smaller, a reduction in the size of the case member that houses the one-way clutch is in demand.

An object of the present invention is to reduce the size of the case member that houses the one-way clutch in the radial direction and to suppress the intrusion of water (seawater) and foreign objects into the one-way clutch by the case member in a fishing reel.

The fishing reel according to one aspect of the present invention is capable of casting (unreeling) a fishing line in a forward direction, and comprises a reel body, a rotor, a one-way clutch, and a case member. The rotor is rotatable relative to the reel body about an axis of rotation and has an internal space. The one-way clutch transmits power in only one direction. The case member is disposed in the internal space of the rotor and can house the one-way clutch. The case member has a flange portion that projects in the radially outward direction, and a fixing portion that is disposed behind the flange portion in a position that overlaps a part of the flange portion, as viewed from the axial direction, and that is fixed to the reel body.

In this fishing reel, it is possible to prevent the intrusion of moisture and foreign objects into the one-way clutch by the flange portion that projects from the cover member in the radially outward direction. Also, since the fixing portion of the case member is disposed in a position that overlaps a part of the flange portion, as viewed from the axial direction, it is possible to reduce the size of the case member in the radial direction.

Preferably, also a barrier member is provided that is rotatable relative to the reel body and that is disposed to face and in front of the case member. The barrier member has an annular first protrusion that projects in the axial direction toward the flange portion of the case member. In this embodiment, it is possible to further suppress the intrusion of moisture into the one-way clutch from the gap between the case member and the barrier member by the barrier member and the first protrusion of the barrier member.

Preferably, the case member has an annular second protrusion that projects in the axial direction toward the barrier member farther inside in the radial direction than the first protrusion. In this embodiment, it is possible to further suppress the intrusion of moisture into the one-way clutch from the gap between the case member and the barrier member by the barrier member, the first protrusion of the barrier member, and the second protrusion of the case member.

Preferably, the second protrusion is formed in a position that overlaps the first protrusion in the radial direction.

Preferably, at least one of the case member or the barrier member is subjected to a water-repellent treatment. In this embodiment, it is possible to further suppress the intrusion of moisture into the one-way clutch from the gap between the case member and the barrier member.

Preferably, a fixing member is also provided that is disposed in a position that overlaps a part of the flange portion, as viewed from the axial direction, and that fixes the fixing portion of the case member to the reel body. The fixing portion of the case member has a through-hole that passes therethrough in the axial direction, and the fixing member has a shaft portion that extends through the through-hole and a head portion formed at one end of the shaft portion. The head portion has a larger diameter than the inner diameter of the through-hole.

Preferably, the total length of the fixing member is shorter than an gap in the axial direction between the flange portion of the case member and the fixing portion of the case member.

Preferably, the fixing member is a screw member.

According to the present invention, it is possible to reduce the size of the case member that houses the one-way clutch in the radial direction and to suppress the intrusion of water (seawater) and foreign objects into the one-way clutch by means of the case member in a fishing reel.

DETAILED DESCRIPTION OF THE EMBODIMENT

Figure 1:
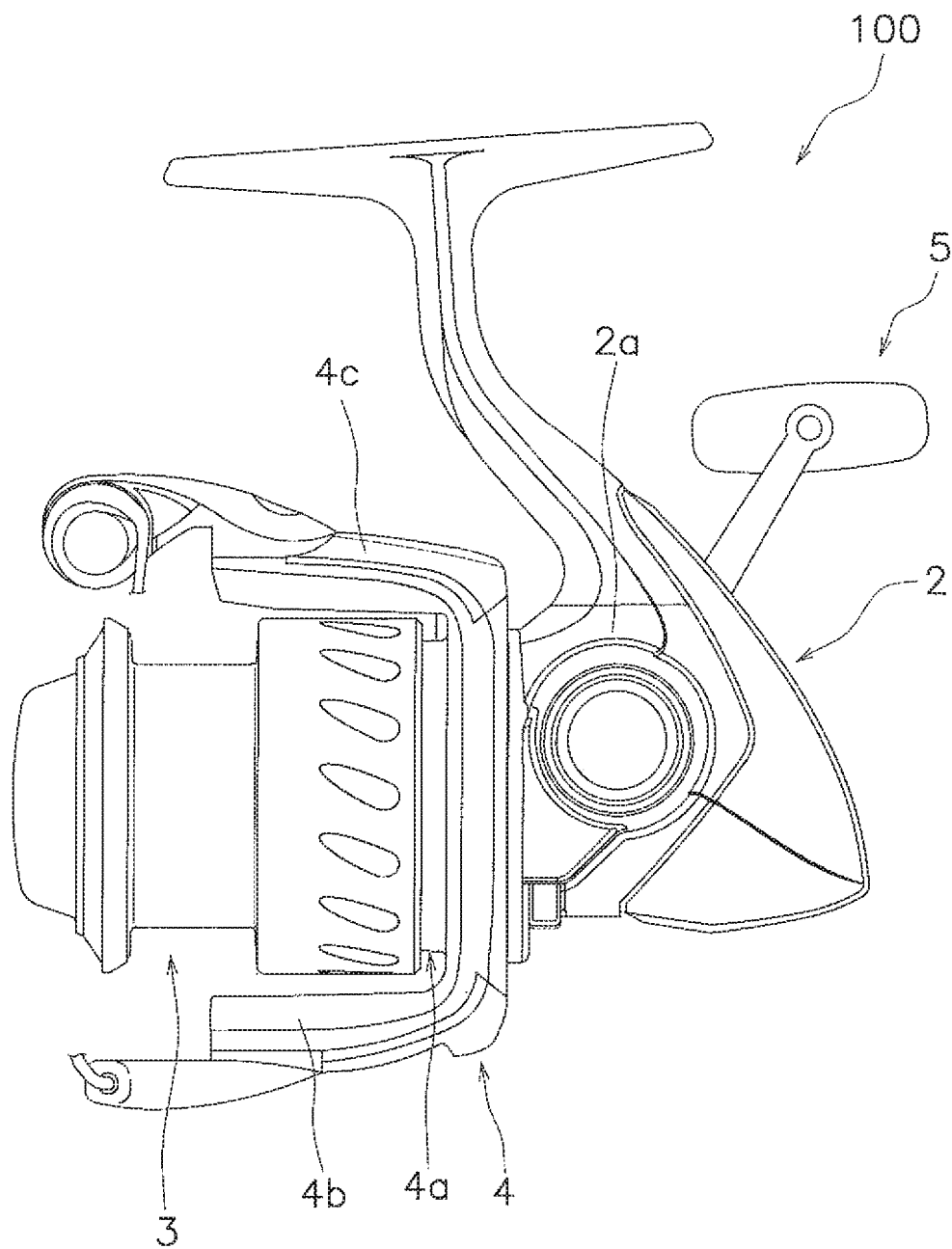
FIG. 1 is a side view of a spinning reel adopting one embodiment of the present invention.
Figure 2:
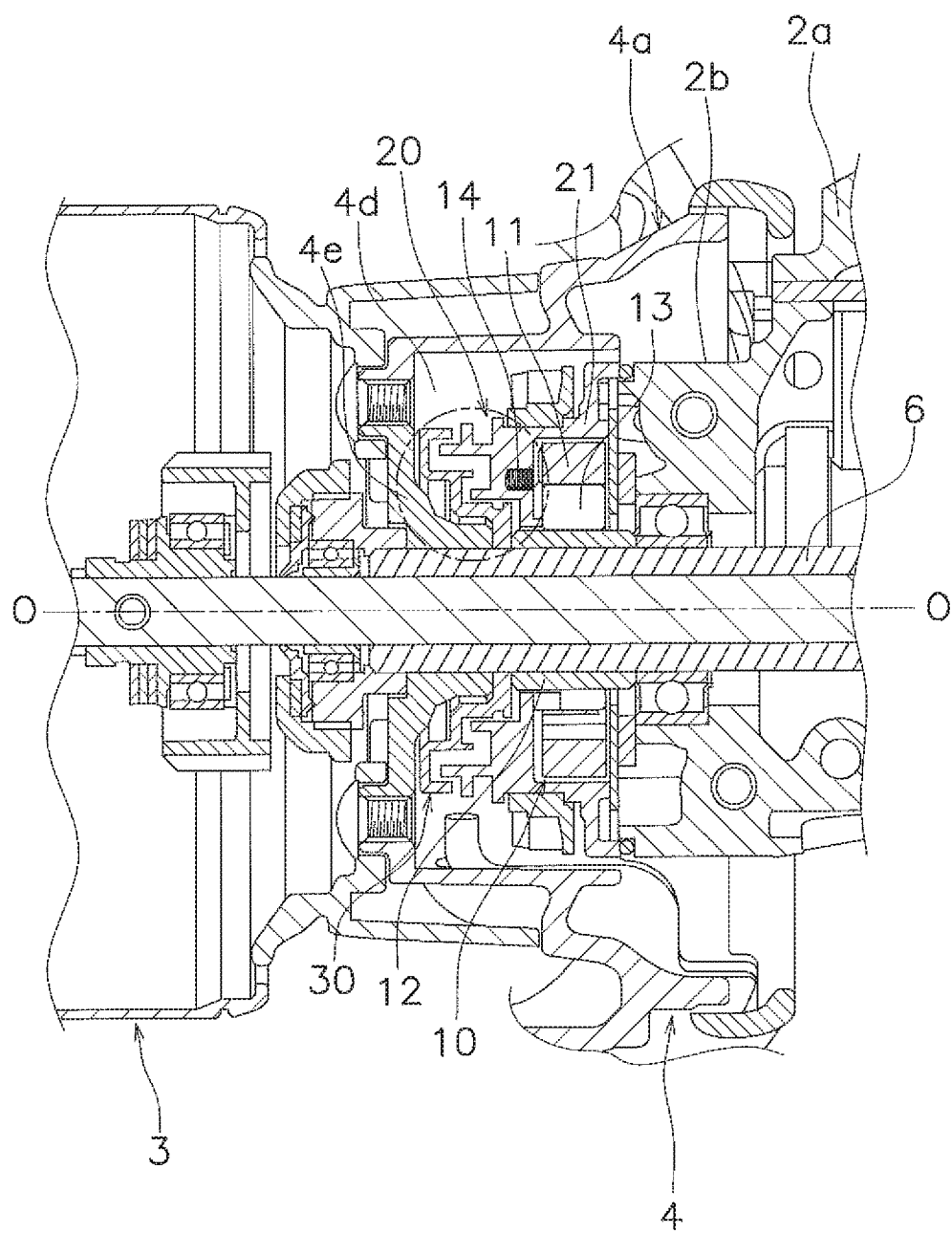
FIG. 2 is a partial cross-sectional view of the spinning reel.

A spinning reel 100 (one example of a fishing reel) according to one embodiment of the present invention is capable of casting a fishing line in a forward direction. As shown in FIGS. 1 and 2, the spinning reel 100 comprises a reel body 2, a spool 3, a rotor 4, a one-way clutch 10, a case member 20, a barrier member 30, and a fixing member 40 (refer to FIG. 4).

In the following description, during fishing, the direction in which the fishing line is cast (unreeled) is referred to as the front, and the opposite direction is referred to as the back. In addition, the direction in which the axis of rotation O of the rotor 4 extends is referred to as the axial direction. Also, the direction that is orthogonal to the axis of rotation O of the rotor 4 is referred to as the radial direction.

FIG. 2 is a partial cross-sectional view of the spinning reel 100. The reel body 2 has a reel body portion 2a and a cylindrical portion 2b. The reel body portion 2a has an internal space, and the internal space houses an unillustrated rotor drive mechanism that drives the rotor 4, and the like. The cylindrical portion 2b extends in the axial direction from a front portion of the reel body portion 2a. As shown in FIG. 1, a handle 5 is rotatably mounted on the reel body 2.

The spool 3 is a member around the outer periphery of which the fishing line is wound. The spool 3 is configured to move back and forth in the axial direction by a rotation of the handle 5 by an oscillating mechanism.

The rotor 4 is rotatable relative to the reel body 2 about the axis of rotation O. The rotor 4 is connected to a pinion gear 6 to which the rotation of the handle 5 is transmitted so as to be integrally rotatable therewith. The rotation of the handle 5 is transmitted to the rotor 4 via the rotor drive mechanism that includes the pinion gear 6.

The rotor 4 comprises a rotor body portion 4a, a first rotor arm 4b, and a second rotor arm 4c. As shown in FIG. 2, the rotor body portion 4a has a cylindrical shape and has an internal space 4d. The cylindrical portion 2b of the reel body 2 is housed in the internal space 4d. The rotor main body portion 4a has a boss portion 4e through which the pinion gear 6 extends at the front portion, and the rear portion opens in the axial direction. The first rotor arm 4b and the second rotor arm 4c are formed in positions that face each other across the rotor body portion 4a on the radially outer side of the rotor body portion 4a.

The one-way clutch 10 transmits power in only one direction. The one-way clutch 10 is attached on the outer periphery of the pinion gear 6 and allows the pinion gear 6 to rotate only in the line winding direction. The one-way clutch 10 is disposed in the internal space 4d of the rotor 4.

The one-way clutch 10 is a roller type one-way clutch that includes an outer race 11, an inner race 12, a plurality of rollers 13, and a plurality of spring members 14.

The outer race 11 is attached to the case member 20 so as to be rotationally fixed. The outer race 11 has a cam surface, not shown, on an inner circumferential surface thereof. The inner race 12 is attached to the pinion gear 6 so as to be integrally rotatable therewith. The plurality of rollers 13 have a cylindrical shape and are disposed between the outer race 11 and the inner race 12. The roller 13 is capable of moving between a transmitting position for transmitting power and a non-transmitting position for not transmitting power. The roller 13 is biased toward the transmitting position side by the spring member 14.

When the handle 5 is rotated in the line winding direction, the roller 13 moves into the non-transmitting position and the rotation of the inner race 12 is not transmitted to the outer race 11. Thus, the pinion gear 6 and the inner race 12 integrally rotate by the rotation of the handle 5 in the line winding direction. On the other hand, when one attempts to rotate the handle 5 in the casting direction, the rotor 13 moves to the transmitting position, and the rotation of the inner race 12 is transmitted to the outer race 11. Since the outer race 11 is attached to the case member 20 in rotationally rigid fashion, the rotation of the handle 5 in the casting direction is thereby restricted.

The case member 20 is a stepped tubular member made of synthetic resin that is formed by resin molding. The case member 20 is disposed in the internal space 4d of the rotor 4. The one-way clutch 10 can thus be housed within the case member 20. As shown in FIGS. 2 to 5, the case member 20 has a case portion 21, a first cylindrical portion 22 (one example of the second protrusion), a second cylindrical portion 23, a flange portion 24, and at least one fixing portion 25. A water-repellent treatment is applied to the case member 20.

Figure 3:
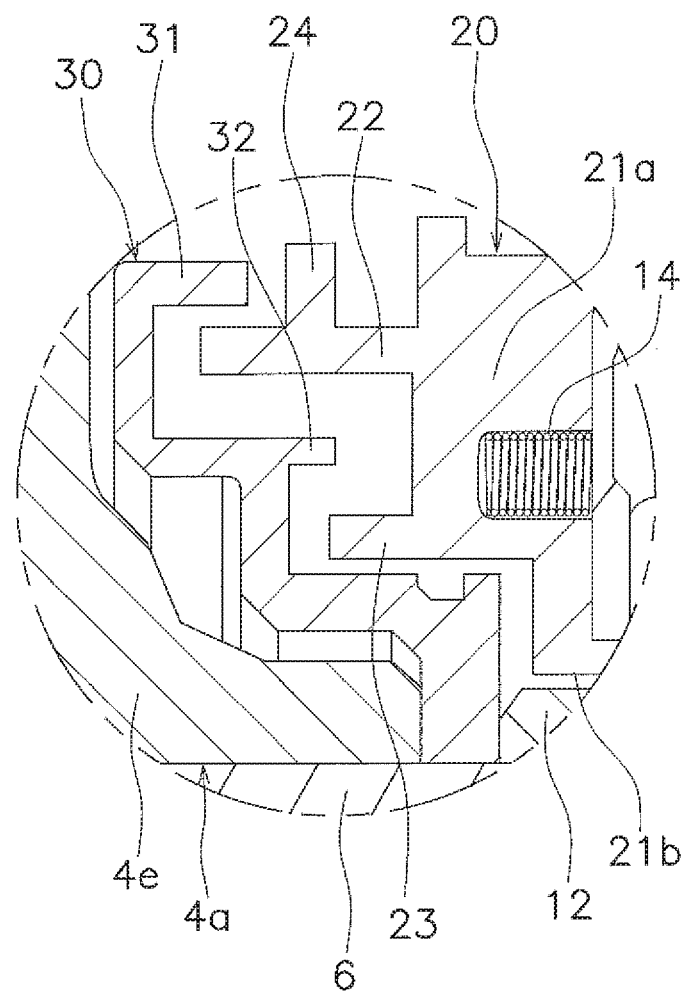
FIG. 3 is an enlarged view of a portion of FIG. 2.

The case portion 21 is configured to lock the outer race 11 of the one-way clutch 10 so as to be rotatably fixed with the inner peripheral portion. As shown in FIG. 3, the case portion 21 has a wall part 21a that internally extends in the radial direction. The wall part 21a has a through-hole 21b through which the inner race 12 of the one-way clutch 10 can extend.

The first cylindrical portion 22 and the second cylindrical portion 23 have a cylindrical shape and extend from the wall part 21a forward in the axial direction. In other words, the first cylindrical portion 22 and the second cylindrical portion 23 have an annular shape and protrude toward the barrier member 30 in the axial direction. The first cylindrical portion 22 extends farther in the axial direction than the second cylindrical portion 23. The second cylindrical portion 23 is provided farther inside in the radial direction than the first cylindrical portion 22.

The flange portion 24 has an annular shape and is formed externally projecting from the first cylindrical portion 22 in the radial direction. In particular, the flange portion 24 projects from the intermediate portion of the first cylindrical portion 22 outside in the radial direction over the entire circumference.

Figure 4:
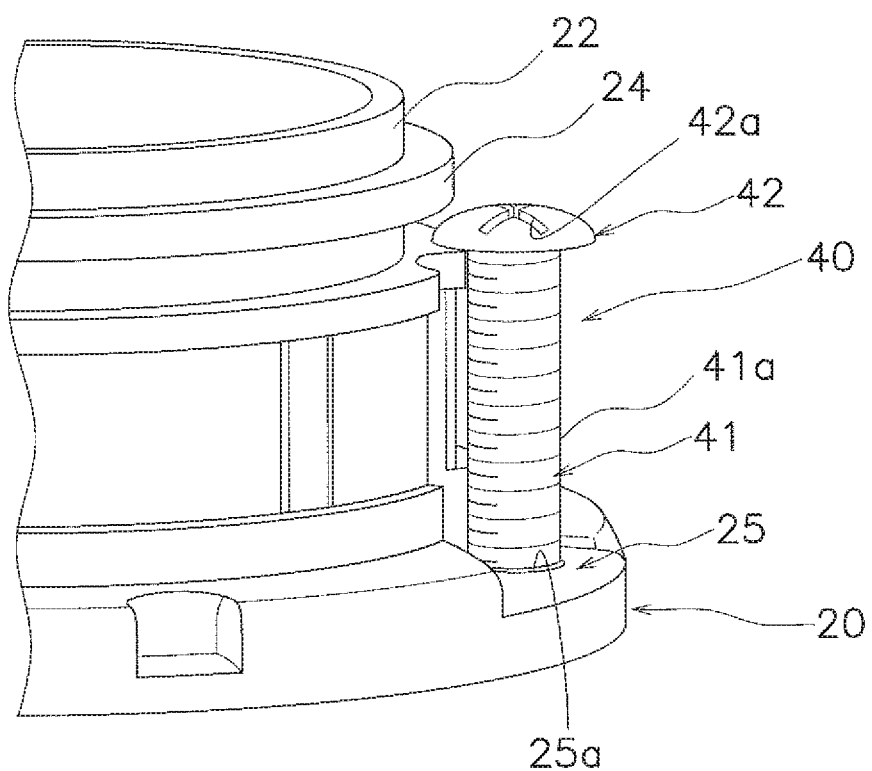
FIG. 4 is a view showing the positional relationship between a case member and a fixing member when the case member is fixed to a reel body.
Figure 5:
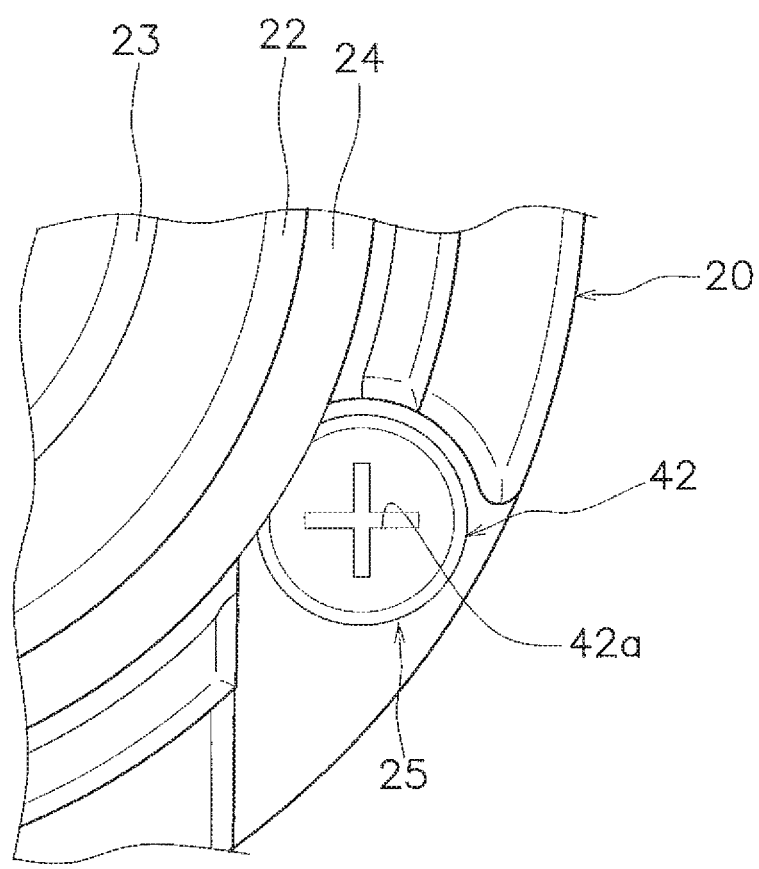
FIG. 5 is a view of the case member as seen from the axial direction.

As shown in FIG. 4, the fixing portion 25 is fixed to the reel body 2 by the fixing member 40. In the present embodiment, a plurality (for example, three) of the fixing portions 25 are formed at intervals in the circumferential direction. As shown in FIGS. 4 and 5, the fixing portion 25 projects outside in the radial direction behind the flange portion 24 of the case member 20. The fixing portion 25, seen from the axial direction, is located in a position that overlaps a part of the flange portion 24. The fixing portion 25 has a through-hole 25a that passes therethrough in the axial direction. The range of the fixing portion 25 in the present embodiment includes the outer peripheral portion of the through-hole 25a, that is, a range that opposes, in the axial direction, a head portion 42 of the fixing member 40, described further below.

The barrier member 30 is a member for suppressing the intrusion of moisture into the one-way clutch 10. As shown in FIGS. 2 and 3, the barrier member 30 is disposed to face the case member 20 in front of the case member 20. The barrier member 30 is an essentially annular member centered at the axis of rotation O, and the pinion gear 6 extends through the center portion thereof in the axial direction. The barrier member 30 is rotatable relative to the reel body 2. In particular, the inner peripheral portion of the barrier member 30 is disposed between the boss portion 4e of the rotor main body portion 4a and the inner race 12 of the one-way clutch 10 in the axial direction, and the barrier member is integrally rotatable with the rotor 4 and the inner race 12. A water-repellent treatment is applied to the barrier member 30.

As shown in FIG. 3, the barrier member 30 has first protrusions 31, 32. The first protrusions 31, 32 are annular in form and are centered at the axis of rotation O.

The first protrusion 31 projects in the axial direction toward the flange portion 24 of the case member 20. The first protrusion 31 is formed in a position that overlaps the first cylindrical portion 22 of the case 20 in the radial direction.

The first protrusion 32 is formed between the first cylindrical portion 22 and the second cylindrical portion 23 of the case member 20 in the radial direction, and projects in the axial direction toward the wall portion 21a of the case member 20.

With the foregoing configuration, the gap between the case member 20 and the barrier member 30 is in the form of a labyrinth in which a plurality of throttle structures are provided in series, by the first cylindrical portion 22, the second cylindrical portion 23, and the flange portion 24 of the case member 20, and the first protrusions 31, 32 of the barrier member 30. The intrusion of moisture into the one-way clutch 10 can thereby be suppressed.

As shown in FIGS. 4 and 5, the fixing member 40 is a screw member, for example, and the fixing portion 25 of the case member 20 is fixed to the reel body 2 by the fixing member 40. The fixing member 40, seen from the axial direction, is located in a position that overlaps a part of the flange portion 24 of the case member 20. The fixing member 40 has a shaft portion 41 and a head portion 42.

The shaft portion 41 extends in the axial direction and passes through the through-hole 25a of the fixing portion 25 in the axial direction. The shaft portion 41 has a male-threaded portion 41a on the outer peripheral surface. The male-threaded portion 41a is screwed into a screw hole, not shown, formed at the distal end portion of the cylindrical portion 2b of the reel body 2. The case member 20 is thereby fixed to the reel body 2.

The head portion 42 is formed at one end of the shaft portion 41 and has a larger diameter than the inner diameter of the through-hole 25a of the fixing portion 25. The head portion 42 has an engagement groove 42a that can be engaged with a screw-tightening tool, such as a screwdriver. As shown in FIG. 5, the head portion 42, seen from the axial direction, is located in a position that overlaps a part of the flange portion 24 of the case member 20. In addition, the engagement groove 42a of the head portion 42, seen from the axial direction, does not overlap the flange portion 24 of the case member 20. It is thereby possible to engage the engagement groove 42a with a screw-tightening tool.

As shown in FIG. 4, the total length of the fixing member 40 is shorter than the axial gap between the flange portion 24 of the case member 20 and the fixing portion 25 of the case member 20. The total length of the fixing member 40 is the axial length that includes the shaft portion 41 and the head portion 42. Thus, when the case member 20 is fixed to the reel body 2, first, the fixing member 40 is moved from the radially outer side of the case member 20 to the fixing portion 25 of the case member 20, at a position behind the flange portion 24 of the case member 20. The shaft portion 41 of the fixing member 40 is then passed through the through-hole 25a of the fixing portion 25 and the fixing member 40 is screwed into the screw hole of the reel body 2 with the screw-tightening tool to fix the case member 20 to the reel body 2.

Since the case member 20 is fixed to the reel body 2 in this way, it is not necessary to provide a notch for passing the fixing member 40 through the through-hole 25a of the fixing portion 25 in the flange portion 24 of the case member 20. Thus, it is possible to make the flange portion 24 project externally in the radial direction over the entire circumference of the case member 20, and to more reliably suppress the intrusion of moisture and foreign objects into the one-way clutch 10 by the flange portion 24. Moreover, since the head portion 42 of the fixing member 40 is disposed at a position that overlaps the flange portion 24 of the case member 20, as viewed from the axial direction, it is possible to reduce the size of the case member 20 in the radial direction, even when the flange portion 24 is formed on the case member 20.

Other Embodiments

One embodiment of the present invention was described above, but the present invention is not limited to the above-described embodiment, and various modifications can be made without departing from the scope of the invention. Particularly, the various embodiments and modified examples described in the present Specification can be combined in any way dictated by necessity.

(In the embodiment described above, the barrier member 30 is included, but it is not necessary to include the barrier member 30. Even in this embodiment, it is possible to prevent the intrusion of moisture into the one-way clutch 10 by the flange portion 24 of the case member 20.

In the embodiment described above, both the case member 20 and the barrier member 30 are subjected to a water-repellent treatment, but it is sufficient if the water-repellent treatment is applied to at least one of the case member 20 or the barrier member 30.

What is claimed is:
1. A fishing reel capable of casting a fishing line in a forward direction, the fishing reel comprising:
   a reel body;
   a rotor rotatable relative to the reel body about an axis of rotation and having an internal space;
   a one-way clutch configured to transmit power in only one direction;
   a case member disposed in the internal space of the rotor and housing the one-way clutch, and having a flange portion projecting in a radially outward direction and a fixing portion disposed behind the flange portion in a position overlapping a part of the flange portion, as viewed from an axial direction, and being fixed to the reel body; and
   a barrier member that forms a labyrinth with the case member the labyrinth forming a plurality of throttle structures provided in series and being configured to suppress intrusion of moisture into the one-way clutch.
2. A fishing reel capable of casting a fishing line in a forward direction, the fishing reel comprising:
   a reel body;
   a rotor rotatable relative to the reel body about an axis of rotation and having an internal space;
   a one-way clutch configured to transmit power in only one direction;
   a case member disposed in the internal space of the rotor and housing the one-way clutch, and having a flange portion projecting in a radially outward direction and a fixing portion disposed behind the flange portion in a position overlapping a part of the flange portion, as viewed from an axial direction, and being fixed to the reel body; and
   a barrier member rotatable relative to the reel body and disposed to face to the case member in front of the case member,
   the barrier member having an annular first protrusion projecting in the axial direction toward the flange portion of the case member.

3. The fishing reel according to claim 2, wherein
the case member has an annular second protrusion projecting in the axial direction toward the barrier member farther inside in a radial direction than the first protrusion.

4. The fishing reel according to claim 3, wherein
the second protrusion is disposed in a position that overlaps the first protrusion in the radial direction.

5. The fishing reel according to claim 2, wherein
at least one of the case member and the barrier member is subjected to a water-repellent treatment.

6. A fishing reel capable of casting a fishing line in a forward direction, the fishing reel comprising:
a reel body;
a rotor rotatable relative to the reel body about an axis of rotation and having an internal space;
a one-way clutch configured to transmit power in only one direction;
a case member disposed in the internal space of the rotor and housing the one-way clutch, and having a flange portion projecting in a radially outward direction and a fixing portion disposed behind the flange portion in a position overlapping a part of the flange portion, as viewed from an axial direction, and being fixed to the reel body; and
a fixing member disposed in a position that overlaps a part of the flange portion, as viewed from the axial direction, and that fixes the fixing portion of the case member to the reel body,
the fixing portion of the case member having a through-hole passing therethrough in the axial direction,
the fixing member having a shaft portion passing through the through-hole and a head portion disposed at one end of the shaft portion, the head portion having a larger diameter than an inner diameter of the through-hole.

7. The fishing reel according to claim 6, wherein
an overall length of the fixing member is less than an axial direction gap between the flange portion of the case member and the fixing portion of the case member.

8. The fishing reel according to claim 7, wherein
the fixing member is a screw member.

* * * * *